United States Patent
Moulton et al.

(10) Patent No.: US 11,123,681 B2
(45) Date of Patent: Sep. 21, 2021

(54) FLUIDIZED GRANULAR ABSORBENT BED FILTER

(71) Applicant: Entegris, Inc., Billerica, MA (US)

(72) Inventors: Tyler Moulton, Grafton, MA (US); James Britto, Westport, MA (US)

(73) Assignee: ENTEGRIS, INC., Billerica, MA (US)

(*) Notice: Subject to any disclaimer, the term of this patent is extended or adjusted under 35 U.S.C. 154(b) by 306 days.

(21) Appl. No.: 15/980,176

(22) Filed: May 15, 2018

(65) Prior Publication Data

US 2018/0333672 A1   Nov. 22, 2018

Related U.S. Application Data

(60) Provisional application No. 62/507,715, filed on May 17, 2017.

(51) Int. Cl.
*B01D 53/02* (2006.01)
*B01D 53/12* (2006.01)

(52) U.S. Cl.
CPC ........ *B01D 53/12* (2013.01); *B01D 2253/102* (2013.01); *B01D 2257/708* (2013.01)

(58) Field of Classification Search
CPC ............... B01D 2257/708; B01D 2253/102
See application file for complete search history.

(56) References Cited

U.S. PATENT DOCUMENTS

| | | | |
|---|---|---|---|
| 4,594,231 A | 6/1986 | Nishino | |
| 4,917,862 A * | 4/1990 | Kraw | B01D 46/10 422/122 |
| 5,607,647 A | 3/1997 | Kinkead | |
| 6,440,198 B1 | 8/2002 | Yang et al. | |
| 2002/0110510 A1 | 8/2002 | Seguin | |
| 2012/0006721 A1 | 1/2012 | Nasuno | |

FOREIGN PATENT DOCUMENTS

| | | |
|---|---|---|
| CN | 201558654 U | 8/2010 |
| CN | 103585825 A | 2/2014 |
| CN | 205435228 U | 8/2016 |
| JP | S4514886 Y1 | 6/1970 |
| JP | S52164148 U | 12/1977 |
| JP | 6161618 A | 3/1986 |
| JP | H01288336 A | 11/1989 |
| JP | H02100626 U | 8/1990 |
| JP | 2001198433 A | 7/2001 |

OTHER PUBLICATIONS

Meera A. Sidheswaran, Energy efficient indoor VOC air cleaning with activated carbon fiber (ACF) filters, 2012, Building and Environment, 47, pp. 357-367 (Year: 2012).*
Quality Air Filters, Filter Sizes, 2016, QualityAirFilters.com, pp. 1-2, <https://www.qualityairfilters.com/air-filter-size/> (Year: 2016).*
Wang, C., et al., "A high efficiency particulate air filter based on agglomerated carbon nanotube fluidized bed," Carbon79, vol. 79, pp. 424-431 (Aug. 6, 2014).
Mofidi, A., et al., "Adsorption of Volatile Organic Compounds on Fluidized Activated Carbon Bed," Health Scope, vol. 2, Issue 2, pp. 84-89 (Jul. 20, 2013).

* cited by examiner

*Primary Examiner* — Christopher P Jones
(74) *Attorney, Agent, or Firm* — Entegris, Inc.

(57) ABSTRACT

Described are filter products and methods of using filter products, wherein the filter products include multiple cells, each cell containing an individual circulating fluidized beds during use.

17 Claims, 6 Drawing Sheets

FLUIDIZED GRANULAR ABSORBENT BED FILTER

CROSS REFERENCE TO RELATED APPLICATIONS

This application claims the benefit under 35 USC 119 of U.S. Provisional Patent Application No. 62/507,715 filed May 17, 2017, the disclosure of which is hereby incorporated herein by reference in its entirety for all purposes.

FIELD OF THE INVENTION

The invention relates to filter products and methods of using filter products, wherein the filter products include multiple individual cells, each cell containing granular filter media contained in the cell such that the granular filter media can become fluidized by flow of gaseous fluid through the cell in an upward direction.

BACKGROUND

Filtering of gaseous and liquid fluid flows is an area of technology that has many important applications in the modern world. Examples include pollution control, filtering of noxious materials, and providing de-particulated and de-contaminated streams of liquid and gaseous flows for use in commercial manufacturing.

In semiconductor processing and the microelectronics industry, as well as in other manufacturing industries, "clean rooms" are places that include highly-purified environments, including atmospheric air. For clean room applications used in microelectronics and semiconductor fabrication industries, air for the clean room atmosphere is continuously processed, using filters, to remove various types of particulate contaminants, as well as contaminants that take the form of "airborne molecular contamination" ("AMC," also "airborne molecular contaminant").

AMC can generally be considered to be contamination present within a gaseous fluid, especially air, on a molecular scale, meaning that contaminants are sub-particle, i.e., molecular, in size. The molecular-scale contaminants are typically chemical materials that have diffused or evaporated into a gaseous atmosphere, originating from an item such as a processing material that is present in a clean room. An AMC may be of any chemical composition, for example any inorganic or organic chemical compound, ion, etc. In clean room environments that exist in the semiconductor processing and the microelectronics industries, typical molecules that exist as airborne molecular contamination include organic or inorganic molecules such as: acid or base compounds, surfactants, polymer additives, organometallic compounds (e.g., catalysts), dopants, oxidizing agents, volatile organic compounds (VOC) such as organic solvents, as well as others. Major sources of these contaminants can include the process chemicals used in a clean room. Undesired effects of the presence of these types of airborne molecular contaminants in a clean room for processing microelectronic and semiconducting devices include any of a variety of undesired reaction or effects between the contaminant and a surface of an in-process microelectronic device or semiconducting material, e.g.: corrosion of a surface of an in-process wafer, circuit board, tool, or instrument, etc.; doping errors; nucleation errors; lithography process-related defects; hazing of wafers, optics, or lenses; and numerous other problems that may generate yield losses in production or cause damage to sensitive production equipment.

At present, one very common method used to remove airborne molecular contaminants from a clean room environment is to provide a molecular filter that contains adsorbent particles to which the airborne molecular contaminant molecules will adsorb. The adsorbent particles are held within an air-permeable structure of the filter, in a relatively static state in the filter. Contaminant-containing air is passed through the filter to allow the air to flow around and past the available surfaces of the adsorbent particles. Passing the airborne molecular contaminant-containing air through the filter allows the airborne contaminants in the air to contact a surface of the statically-held adsorbent particles, to then become adsorbed onto a surface of a particle. The most common filter construction for these purposes is a pleated filter construction that contains granular filter media such as particles of activated carbon, held in place in a fibrous material such as contained a fibrous, porous, e.g., sponge-like "loft," with that "loft" material being sandwiched as an inner layer between two outer fibrous layers, e.g., fibrous scrims. These multi-layer filter constructions also include an amount of adhesive to hold the granular adsorbent, loft, and scrim layers in place.

While these filter structures are sufficiently effective to be used commercially, they do exhibit certain shortcomings, based on their structure. The need for an adhesive, for example, can cause reduced filtering efficiency to the extent that the adhesive contacts surfaces of the adsorbent particles; if surfaces of adsorbent particles are covered by adhesive, those surfaces are not available to adsorb any molecular contaminants passing through the filter. Additionally, the pleated designs do not allow for equal distribution of the airflow across the adsorbent particles, reducing airflow at folds of pleated filters and creating an inconsistent concentration load on areas of the adsorbent particles.

Continuing need exists across all areas of industry, manufacturing, and commercial and consumer technologies, for improved filters and improved filtering methods.

SUMMARY

Accordingly, the present disclosure relates to novel and inventive filter products, and methods of using the novel filter products. The inventive filters include multiple cells, with each cell containing granular filter media (sometimes referred to herein as "granular filter media," "granular filter particles," or simply "particles"). An amount of granular filter media is contained freely within each of the cells of a filter in a manner that allows the granular filter media to move freely within the cell, such as in response to a flow of fluid passing through the cell. More particularly, each individual cell contains a collection of granular filter particles that can become fluidized within the individual cell upon a flow of fluid passing through each individual cell in an upward direction, meaning in a direction that includes a component of an airflow velocity that is upward, meaning opposite of gravity.

In use, fluid flowing in an upward direction through the cells of the filter contacts and passes surfaces of the particles contained in each cell, and is capable of causing particles of each of the individual cells to become "fluidized" within the fluid flow, i.e., the cell, particles, and fluid flow constitute a "fluidized bed" or "circulating fluidized bed" (or CFB). Specifically, the individual particles contained in a cell can become freely-moving particles that are suspended (against the force of gravity) by the force of the fluid that is flowing in an upward direction past the particles.

In the past, fluidized-beds of particles used for processing a flow of fluid have been in the form of suspended particles in a single, relatively large vessel that contains a large collection of particles in a single volume, through which volume an amount of fluid is caused to flow to cause particles in the volume to become fluidized. See, e.g., U.S. Pat. No. 6,440,198. The vessel can be a non-replaceable structure of a gas processing system, but can contain a collection of particles within a single, un-partitioned interior volume, to allow for the particles to be removed from the volume and replaced, e.g., during use or after an amount of use of the particles.

In contrast, the novel and inventive filter products of the present description include multiple cells within a single filter structure, with each cell containing a collection of granular filter particles that can become fluidized in a flow of fluid. These filters provide multiple, small, individual "circulating fluidized bed" (CFB) cells, each of which during use can contain an individual circulating fluidized bed. Various advantages relative to past fluidized bed gas processing methods, and relative to past uses of conventional filters, may be present in the use of the inventive filters, including: the improved efficiency of processing a flow of fluid by the use of fluidized media particles as compared to past filter designs; and, the ability to manipulate, replace, or exchange a fluidized-bed type filter with the ease and convenience of using conventional filter designs and comparable replaceable filter assemblies in the form of replaceable "panel" or "frame"-type filter assemblies.

Regarding the former, the use of a filter as described that operates on a principle of fluidized particles of filter media, provides advantages relative to previous filter designs that contain filter media held by a filter in a substantially static state. Advantageously, a multiple-fluidized-bed-containing filter product as described includes multiple circulating fluidized beds (CFB) in the form of individual cells, arranged for example in an array, optionally also within a support structure such as a frame or case. Fluidization of particles in one or more of the individual cells occurs when granular filter particles within an individual cell are suspended in a fluid-like state by the force provided by an upward flow of fluid at a useful flow rate and linear velocity through the individual cell. Fluidization is a function of several parameters that include but are not limited to: granular filter media particle dimensions and density, bed (i.e., an individual cell) geometry, velocity of the fluid flow, density of the fluid of the fluid flow, and the voidage in a cell (i.e., the amount of space in the cell that is not taken by granular filter media particles).

The design of multiple-fluidized-bed-containing-filters as described provides improved performance relative to the performance of comparable filters that are constructed of granular filter media particles held in a substantially static configuration within a multi-layer filter construction. A filter as described, which allows granular filter media particles to become fluidized during use, allows for the entire surface area of all granular filter media particles of the filter to be exposed to and to contact a flow of gaseous fluid. The individual cells and the overall filter construction of inventive filters do not require and can specifically exclude the need for inert construction materials (loft, scrim) or adhesive that can interfere with the functioning of granular filter media particles by preventing contact between surfaces of the filter media particles and contaminant materials (e.g., airborne molecular contaminants) contained in a flow of gaseous fluid passing through a filter.

One advantage of filters as described is increased residence time of a fluid that flows through the filter, i.e., through an individual cell of the filter, meaning increased time of contact between the fluid and granular filter media particles. Cell dimensions can be designed to create a depth dimension in a direction of a flow of gas through the cell that is many times greater than what is achievable as a depth of previous filter designs.

As another advantage, the constant circulation (i.e., movement) of media particles suspended by the fluid flow within the individual cells allows for highly efficient fluid-to-particle surface contact. Of notable advantage, the entire surfaces of the particles are exposed for contact with the fluid flowing through the filter, because no surfaces of the particles are held stationary or in continuous contact with a structure of the filter.

Also advantageously, preferred filter and cell designs as described may produce a flow of a fluid through the filter that exhibits relatively improved uniformity of flow and uniformity of pressure across the area of the filter from which the flow exits as compared to other filter designs. While turbulent flow through individual cells of an inventive filter (i.e., through individual CFBs) can result in localized flow and pressure gradients within the volume of the cell, flow that exits from an outlet side of a filter that includes an array of cells as described herein can exhibit a more uniform, e.g., laminar, flow over the area of the exiting-side (i.e., the outlet side) of the filter. Moreover, the turbulent nature of the flow of the fluid through a cell, through and around particles suspended in the cell by the fluid, prevents the passage of any substantial amount of the fluid through a filter without the fluid coming into effective (e.g., adsorption-causing) contact with the filter media, i.e., prevents fluid from flowing through the filter while bypassing the filter media particles.

Example filter designs as described can allow a filter of a given size (meaning area of a filter through which fluid flow passes) to exhibit increased filter capacity, or, instead, can allow a filter with a given capacity to be prepared to have a reduced size (this size referring to the area of the filter on a side at which fluid (e.g., airflow) enters or exits the filter, e.g., an inlet side or an outlet side).

Previous conventional filters with fixed particles, or particles that have surface areas that are not fully exposed to a fluid flow, can exhibit a reduced ability to efficiently contact the AMC present in a gaseous fluid. Previous fixed-particle filters may also exhibit non-uniform particle distribution across portions of the filter. This type of intra-filter non-uniform distribution of filter media particles within a filter can cause intra-filter areas of decreased filtering efficiency (e.g., decreased adsorption on adsorptive filter media), also referred to as "bypass." Advantageously, the presently-described filter designs, with individual cells that contain fluidizable filter media particles, do not suffer from intra-filter non-uniformities or resultant loss of filtering efficiency or bypass.

A second general advantage of filters as described is that the fluidized-bed-type filters described herein, in contrast to previous types of processing equipment that operate on the principle of a fluidized particle bed, can be constructed in the form of a replaceable, easy-to-handle filter assembly that can be handled, removed, and replaced in a fashion similar to previous filter products, such as panel-type pleated-filter assemblies. For example by taking the form of a panel-type filter assembly that includes an array of self-contained fluidized beds in the form of CFBs, the inventive filter assemblies can be capable of removal and replacement within an air-processing system as a single, convenient unit.

The present filters (e.g., filter assemblies) can include multiple, small, e.g., miniature cells, each of which is a self-contained, complete, functional fluidized bed of "CFB"; each cell contains a space that contains filter media particles that can be fluidized. A filter assembly contains multiple such cells, in an array. Each cell can have an inlet and an outlet that can be of any desired size, meaning area, and the cells can be present as an array with individual inlets and outlets of the cells being distributed over an area of a planar surface of the filter, e.g., on an inlet side, and an outlet side of the filter assembly, respectively. The array may contain tens or hundreds of cells, including an inlet and an outlet for each, and the cells of the array can be handled as a single filter assembly, optionally supported by or enclosed by a frame or other supportive structure. Such a filter may be referred to as a panel-type filter or a frame-type filter, and can mimic the size and handling properties of previously and currently-used conventional (e.g., pleated) filters.

The panel-type filters that contain multiple cells, each cell containing a fluidizable bed or CFB, can be easily and efficiently handled, moved, removed, and replaced, as compared to previous fluidized bed-type processing systems. Examples of the presently-described filters that contain a fluidized bed filtering mechanism having the form of a frame-style filter may be of a size that can be easily moved, handled, and inserted by hand, e.g., inserted into and later removed from a flow of fluid (e.g., an airflow) of a fluid-processing (e.g., air-processing) system. A fluid (e.g., air) processing system may include a space in a duct or panel that is adapted to contain the frame-style filter to insert the filter into a flow of fluid (e.g., airflow) to be filtered. In these systems, the filter is easily replaceable, meaning that the filter has a size and a structure that allow the array of cells of the filter to be easily placed into, and eventually, as desired, removed from, an airflow, for example after a desired amount of time, at which time a new or fresh filter with a second array of cells (CFBs) is inserted into the airflow to effect subsequent filtering.

Optionally, if desired, an array of cells of a filter assembly can also be designed to allow for replacement of the filter media particles within the cells of the filter assembly. For example, with the filter removed from use filtering a flow of fluid, the cells of the filter may be designed to be opened to allow used filter media particles to be removed, and to allow for new (fresh, re-freshed, or re-generated) filter media particles to be added to replace the removed used particles. The cells of the array can then be re-closed and the filter, with replaced filter media particles, can be placed back into a flow of fluid for filtering.

In one aspect, the invention relates to a filter adapted to remove contaminant from a flow of fluid. The filter includes: two or more cells, each cell defined by sidewalls extending between a cell inlet and a cell outlet, and each cell having a volume between the sidewalls, inlet, and outlet, and granular filter media comprising individual granules contained within the volume of each of the two or more cells in a loose fashion that allows individual granules to move within the volume of each of the two or more cells in response to a flow of fluid passing through each cell.

In another aspect, the invention relates to a system for removing contaminant from a flow of gaseous fluid. The system includes: ducting to guide the flow of gaseous fluid; a space in fluid communication with the ducting to place a removable filter assembly in the flow of gaseous fluid to cause the flow of gaseous fluid to flow through the filter assembly; and a removable filter assembly in the space. The removable filter assembly includes: two or more cells, each cell defined by sidewalls extending between a cell inlet and a cell outlet, and each cell having a volume between the sidewalls, inlet, and outlet; and granular filter media comprising granules contained within the volume of each of the two or more cells in a loose fashion that allows individual granules to move within the volume of each of the two or more cells in response to a flow of gaseous fluid passing through each cell.

In a further aspect, the invention relates to a method of removing contaminant from a flow of fluid. The method includes providing a filter that includes: two or more cells, each cell defined by sidewalls extending between a cell inlet and a cell outlet, and each cell having a volume between the sidewalls, inlet, and outlet; and granular filter media comprising individual granules contained within the volume of each of the two or more cells in a loose fashion that allows individual granules to move within the volume of each of the two or more cells in response to a flow of gaseous fluid passing through each cell. The method further includes causing fluid to flow through the two or more cells in a manner to cause the granules to become fluidized within the flow of gaseous fluid.

BRIEF DESCRIPTION OF THE DRAWINGS

FIGS. 1, 2A, 2B, 3A, 3B, and 3C are schematic and not necessarily to scale. All figures are illustrative and non-limiting of the described filters or methods.

DETAILED DESCRIPTION

Described herein are novel and inventive filter products and methods of using the novel and inventive filter products. The inventive filter products (filters or filter assemblies) contain multiple individual cells, with each cell containing filter media in the form of a collection of granules or particles, referred to herein as "granular filter media," "granular filter particles," "granular filter media particles," or simply "granules" or "particles." The granular filter media particles are contained loosely in each of the individual cells in a manner that allows the individual particles to move in response to a flow of gaseous fluid moving through the cell. More particularly, each cell contains a collection of granular filter particles, and that collection of particles can be fluidized by the flow of gaseous fluid passing in an upward direction (meaning any direction that includes a component of a fluid flow velocity that is upward, opposed to gravity) through the cell. Each individual cell of a filter that contains fluidized particles may be referred to as a circulating fluidized bed, or CFB. The flow of fluid required to fluidize the particles, in terms of velocity, volumetric flowrate, and pressure, will depend on factors such as the density of the fluid and the size, density, and physical properties (shape, surface texture, etc.) of the particles. As used herein, the term "upward" refers to a down-to-up direction that is opposed to gravity; flow through a cell that is sufficient to fluidize filter media particles contained in a cell may be directly upward, i.e., essentially vertical, or may be substantially upward, i.e., mostly vertical, while still including a sufficient vertical component to cause the particles to become fluidized due to the force of gaseous fluid flow of sufficient pressure, rate, and velocity. The particles are considered to be fluidized when the force of gravity on the particles is opposed, approximately equally, by the force of the fluid that is flowing through the cell to support the particles, such that the particles become suspended by the flow of fluid and become freely moving within the cell.

Examples of inventive filters include an array of multiple individual cells arranged in a planar configuration, with two opposed major sides that include what are referred to as an inlet side (the side on which cell inlets reside) and an outlet side (the side on which outlets reside). See, e.g., FIG. 1. Each cell contains media particles capable of being fluidized by a flow of fluid through the cell in an upward direction. The volume of each cell can be as desired, for example a volume of at least 0.25 cubic inches, e.g., a volume in a range from 0.3 to 10 cubic inches (or larger), or from 0.4 to 5, 8, or 9 cubic inches. These volumes are exemplary and non-limiting; volumes outside of these ranges can also be effective for cells of filters as described, as will be apparent based on the present disclosure taken as a whole. Those of ordinary skill in the relevant art with knowledge of this disclosure are capable of selecting a specific volume to address the demands of a particular system.

The relative volume of filter particles in a cell, per total volume of the cell, can be any volume of particles that allows fluidization of the particles within the cell. Non-limiting example volumes of particles in an individual cell may be in a range from 5 to 70 percent of the total volume of the cell, e.g., from 10 to 60 percent of the volume of the cell, or from 15 up to 20, 30, 40 or 50 percent of the volume of an individual cell.

Each of the cells can be defined by an inlet at an inlet end, an outlet at an outlet end, and sidewalls that extend from and between the inlet end and the outlet end, the sidewalls typically and preferably being continuous between the inlet end and the outlet end. The inlet end can be considered the location at which fluid enters the cell, with the fluid flowing subsequently through the cell in an upward direction and then exiting the cell at the outlet end. The inlet end can include a porous cover such as a screen, scrim, or other type of porous, planar structure such as a metal frit, which supports filter media particles at rest in the cell to prevent the particles from passing out of the cell through the inlet. The outlet end can also contain a porous cover in the form of a screen, scrim, or other type of porous, planar structure such as a metal frit, which prevents media particles from exiting the cell through the outlet end during use, such as by being carried out of the cell through the outlet end by fluid passing through the cell.

Desirably, an array of cells can contain a desired number of cells aligned in a repeating pattern that extends across an area of the filter in a length and in a width direction (these directions being perpendicular to the depth of the cells), with the cells of the array being substantially uniform in volume, depth, width, and height. Cells, i.e., sidewalls of cells, may be made of any machined or extruded material, such as metal or a useful polymeric material.

The dimensions of a cell or cells of an array can be any useful dimensions, including a depth (or "height") that extends between the inlet end and the outlet end, and width and length dimensions that are perpendicular to the depth. The depth can advantageously be a depth that is greater than a thickness of a conventional, multi-layer (e.g., pleated) filter, which means, for example, the combined thicknesses of multiple layers of scrim, loft, or comparable materials of a multi-layer filter. Example depths of cells of a filter as described, containing multiple individual circulating fluidized beds, can be at least 0.25 inch e.g., from 0.3 to 24 inches (or greater), or from 0.5 to 10, 15, 18, or 20 inches. These depths are merely exemplary and should be considered to be non-limiting; depths that are outside of these ranges can also be effective for cells of filters as described, as will be apparent based on the present disclosure taken as a whole.

The width and length of a cell can be as desired to produce a cell of useful overall dimensions. Together, a length and width of a cell may be sufficient to provide a cell inlet and a cell outlet that each have a cross sectional area in a range of at least 0.4 square inch, e.g. from 0.5 to 7, 8, 9, or 10 square inches. These specified areas of inlets and outlets are merely exemplary and should be considered to be non-limiting; areas of cell inlets and cell outlets that are outside of these ranges can also be effective for cells of filters as described, as will be apparent based on the present disclosure taken as a whole.

The shape of the area of the inlet and the outlet, which preferably corresponds to the cross-sectional shape of the cells (taken perpendicular to an axis of the cell in the depth direction, i.e., a direction of linear fluid flow through the cell), can be of any desired geometry, such as round, rectangular, square, hexagonal, triangular, trapezoidal, etc., or irregular.

When cells are arranged in an array, the array can contain two or more cells placed and supported in a repeating arrangement, with cells aligned in parallel in the depth direction. Preferably, the areas of the cell inlets are aligned in an inlet plane, and the areas of the cell outlets are arranged in an outlet plane that is parallel in two dimensions to the inlet plane. An inlet plane may also be (but is not necessarily) at or adjacent to a surface of an inlet side of a filter assembly. An outlet plane may also be (but is not necessarily) at or adjacent to a surface of an outlet side of a filter assembly.

Figure 1:
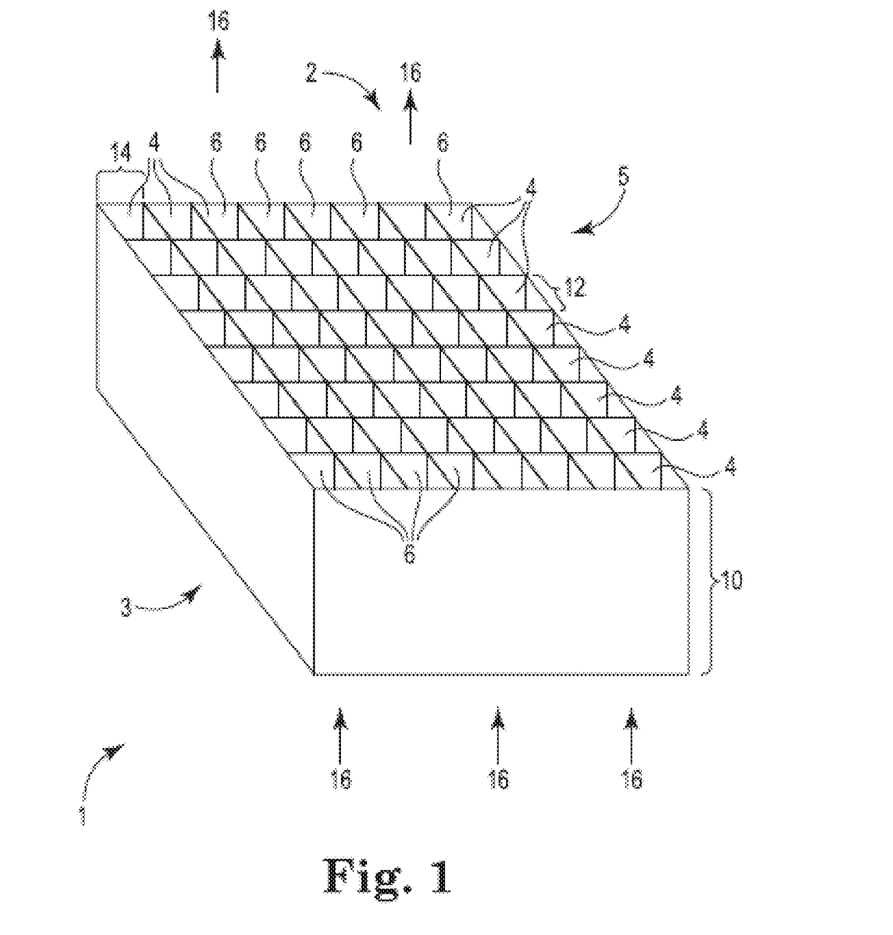
FIG. 1 illustrates an example embodiment of an array or a filter assembly of the present description.

As an example of an array of cells, FIG. 1 shows filter assembly 1 that includes an array 2, of cells 4. Array 2 includes inlet side 3 on a bottom of array 2, and outlet side 5 on a top (upper side) of array 2, as illustrated. Each cell has an inlet 8 on bottom side 3 of array 2 (not shown on array 2 of FIG. 1), an outlet 6 (square opening) on outlet side 5 of array 2 (shown on top of cells 4 of array 2), a depth 10, width 12, and length 14. The cell inlets (8) and cell outlets (6) are square, as are the cross-sectional shapes of the cells extending between the inlets and outlets. Gaseous fluid 16 can flow in an upward direction through array 2, passing in the same upward (and vertical) direction through each of the individual cells 4.

Figure 2A:
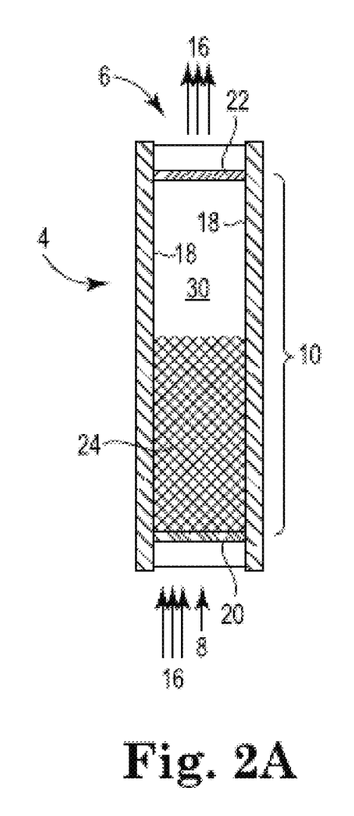
FIGS. 2A and 2B illustrate example embodiments of cells of the present description.
Figure 2B:
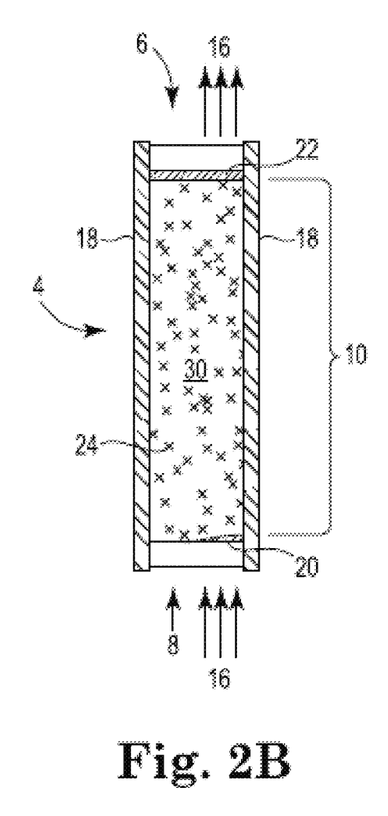

Referring to FIGS. 2A and 2B, an individual cell 4 of array 2 is illustrated. Cell 4 includes sidewalls 18, porous inlet cover 20, and porous outlet cover 22 (these are not shown in FIG. 1). Cell 4 also contains filter media particles 24. Cell volume 30 is defined as the volume between sidewalls 18, inlet cover 20, and outlet cover 22. While no fluid is flowing through cell 4 (see FIG. 2A) filter media particles 24 are at rest at a lower portion of cell 4, supported by porous inlet cover 20. When fluid 16, such as air, flows in an upward (e.g., vertical, opposed to gravity) direction through cell 4, the fluid is capable of causing filter media particles 24 to become suspended in the flow of the fluid, i.e., causing the particles to become fluidized. See FIG. 2B.

During use of a filter as described herein, multiple or all cells (4) of an array 2 of a filter can contain particles that are fluidized as shown at FIG. 2B.

An array, such as array 2 of FIG. 1, can be placed directly in a vertical flow of fluid, and the vertical flow can enter directly into each inlet, pass through each cell, and exit the cell at an outlet. Such an array can be adapted directly to a filtering system in which fluid flow is upward and vertical. In other systems, however, fluid may flow either down (i.e., opposite of upward and opposed to gravity) or horizontally. In such a system, the individual cells or the array of cell inlets can communicate with one or more additional fluid channels in fluid communication with the inlet, that re-direct the flow from downward or horizontal, to upward, for passage of the fluid in an upward direction into the inlets and through the cells. Still additional channels in fluid communication with individual cell outlets or the array of cell outlets can alter the direction of flow of fluid exiting from the cell outlets, to re-direct the flow of fluid exiting the cell outlets to the original downward (or horizontal) direction, after exiting the cell outlets.

In arrays and filter assemblies that include channels to change the direction of a flow of fluid entering or exiting cells of an array, the major sides of the filter assembly do not necessarily align with the cell inlets and cell outlets. In these filter assemblies, an inlet side of a filter may be considered to be a side of the filter that includes inlets to the channels that lead to the cell inlets, and a second major side of the filter assembly, the outlet side, can be considered the side of the filter assembly that includes outlets of passages that leads from the cell outlets.

Figure 3A:
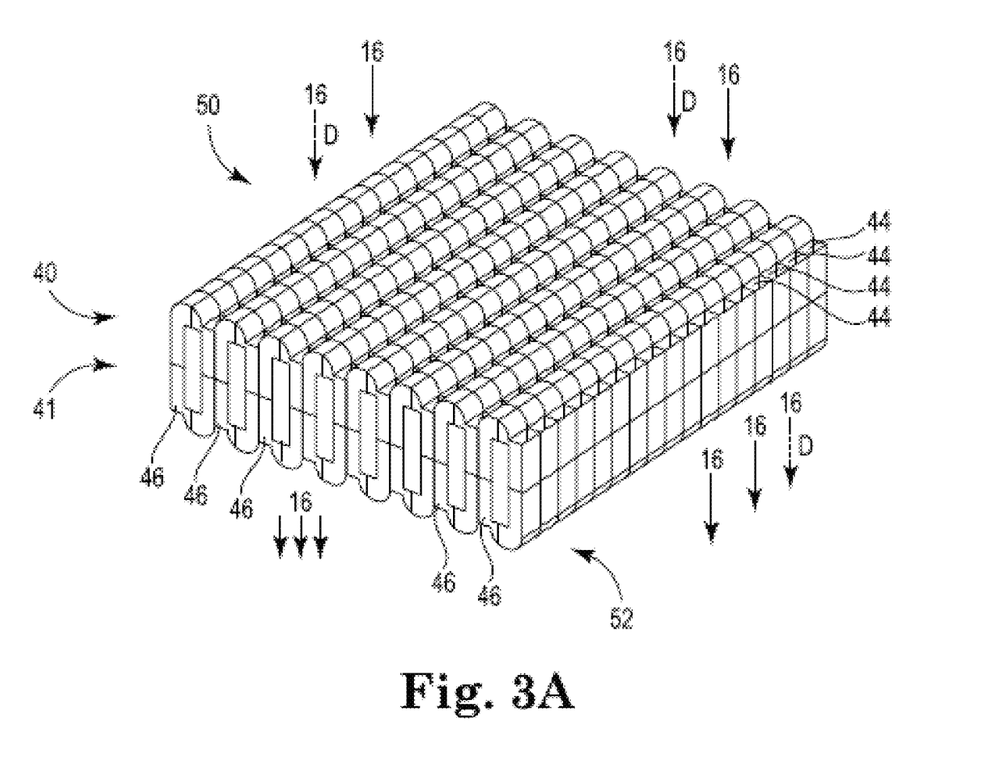
FIGS. 3A, 3B, and 3C, illustrate an example array (e.g., filter assembly) and example cells of the present description.
Figure 3B:
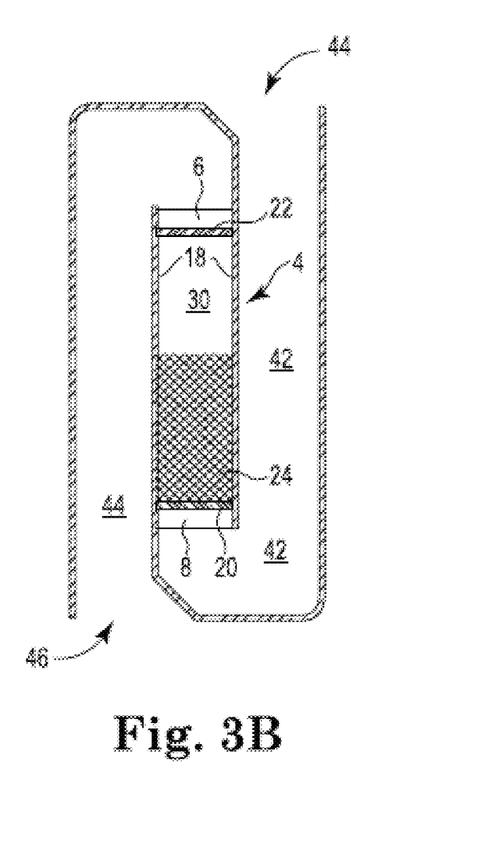
Figure 3C:
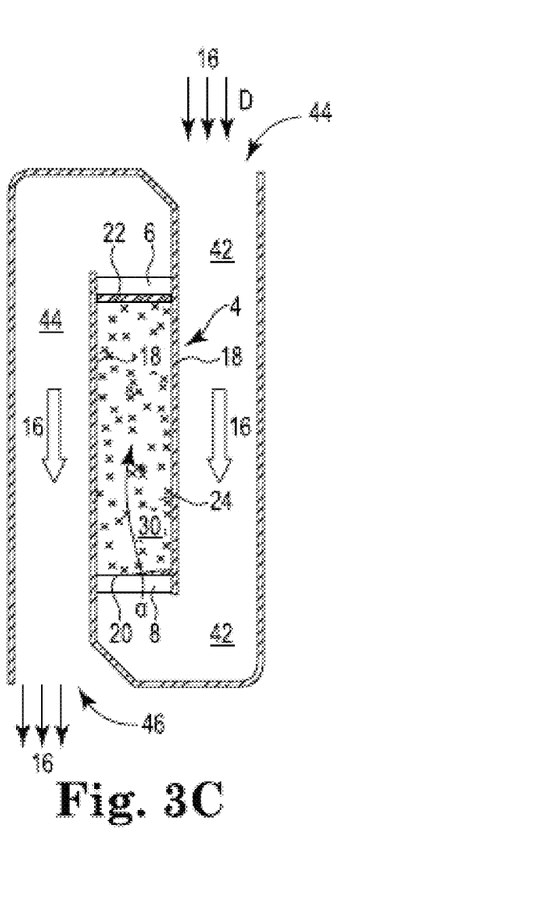

FIGS. 3A, 3B, and 3C illustrate filter assembly 41 that includes array 40 that includes cells 4. Each cell 4 includes cell inlet 8, cell outlet 6, sidewalls 18, porous inlet cover 20, porous outlet cover 22, and cell volume 30 defined as the space between sidewalls 18, inlet cover 20, and outlet cover 22 (see FIGS. 3B and 3C). Each cell 4 contains filter media particles 24 (see FIGS. 3B and 3C). Each cell 4 is in fluid communication with intake channel 42, which is in fluid communication with cell inlet 8, and outlet channel 44, which is in fluid communication with cell outlet 6. Array 40 includes inlet side (top side) 50 and outlet side (bottom side) 52.

In use, fluid 16 that flows in a downward direction (D) toward filter array 40 enters intake channel inlet 44, located at an inlet or top side 50 of filter assembly 41. Fluid 16 continues in a downward direction parallel to a depth of cell 4; at a bottom portion of intake channel 42, channel 42 turns to meet inlet 8 at a bottom of cell 4, with intake channel 42 effectively re-directing the flow of fluid 16 from its downward direction D when initially contacting inlet side 50 of filter assembly 41, 180 degrees, to an upward direction U, and leading the fluid flow into cell inlet 8 in an upward direction. Upon entering cell inlet 8, the fluid flow passes through cell 4 and particles 24 while traveling in upward direction U. After passing in an upward direction U through the entire depth of cell 4, the flow of fluid exits cell 4 by passing through cell outlet 6, at which point the fluid flow enters outlet channel 44, still traveling in an upward direction. At a top portion of outlet channel 44, channel 44 turns 180 degrees and re-directs the flow of fluid 16 to original downward direction D, and the fluid 16 continues to flow through a length of outlet channel 44 in downward direction D, parallel to depth of cell 4, subsequently exiting outlet channel 44 at outlet channel outlet 46 at an outlet side 52 of filter assembly 41.

While no fluid is flowing through array 40 of filter assembly 41 and cells 4, filter media particles 24 are at rest at a lower portion of cells 4, supported by inlet cover 20 (see FIG. 3B). When fluid 16, such as air, flows in a downward direction toward upper surface 50 of array 40, the fluid enters intake channel 42 and is subsequently re-directed by intake channel 42 to an upward (e.g., vertical, opposed to gravity) direction to pass through cell 4 in the upward direction. When passing through cell 4 in the upward direction, the fluid 16 is capable of causing particles filter media particles 24 to become suspended in the flow of fluid 16, i.e., causing the filter media particles 24 to become fluidized (see FIG. 3B).

Optionally, an array of cells 4, e.g., array 2 or array 40, can be effective as a self-supporting filter assembly that can be inserted into a flow of fluid. An array of cells 4 such as array 2 or 40 does not require and may specifically exclude any additional structure designed to maintain a shape and structural rigidity of array 2 or 40 for use filtering a flow of fluid. Optionally, example filter assemblies can additionally include a frame that surrounds a perimeter of an array 2 or 40 to provide additional structural support, or to allow the array to be placed in an opening in a fluid handling system, to place array 2 or 40 in a flow of fluid with fluid entering an inlet side, passing through an array of cells 4 in an upward direction, and then exiting from an outlet side of the filter assembly.

A filter as presented herein, containing multiple cells that each contain fluidizable filter media particles, will be understood to be capable of being adapted for uses in filtering fluids, to remove contaminants, in any environment in which fluid flows contain contaminants that are removed by filtration. The contaminants may be part of any fluid flow of any of a variety of processing, manufacturing, or commercial environments. The filters may be effective to remove contaminants from a broad variety of fluid flows, preferably from a flow of gaseous fluid such as air, a vapor, or an inert gas. The contaminant may be any type of contaminant that can be removed from a fluid flow by use of filtration media, exemplary contaminants including particulate-sized contaminants as well as airborne molecular contaminants (AMCs). According to preferred filter products and methods as described, particularly useful adaptations of the presently-described filter and filtering methods can be those that are useful to remove airborne molecular contamination (AMC) from a flow of air or an inert gas, for example air that is entering or circulating through a clean room.

Examples of particular filters useful for controlling AMC levels in cleanrooms can include filter media that is of a chemical type adapted and effective to capture AMCs by adsorption (such adsorbent filtration media are often used in cleanroom environments in combination with an additional filter system that is effective to remove contaminants that are different from, e.g., larger than AMCs, such as nano-size particulate contaminants). Effective adsorptive-types of filter media include various types of polymeric filter media, as well as activated carbon filter media (e.g., granular activated carbons, or GACs). In a filter of the present description, any of these types of filter media can be used in granular (i.e., particulate) form, with granules of sizes, shapes, consistencies (densities), and other physical properties such as particle size range and distribution, for the granular particles to be capable of being uniformly fluidized by a flow of fluid when contained in a cell of a filter. The efficiency of the adsorption of airborne molecules on surfaces of granular filter media particles can depend on various factors such as the porosity, chemical composition, and specific surface area and mechanical surface properties of the granular filter media. Depending on the chemical nature of AMC being removed from a fluid flow, granular activated carbon filter media and polymeric filter media can be modified by chemical treatments or by application of a chemical coating (e.g., of a catalyst) to enhance adsorptive performance of the granular filter media particles.

In the filtration arts, various adsorptive filtration media materials are known to be useful in adsorptive, chemical-type filters, including examples that have been previously used in multi-layer, e.g., pleated, filter designs. Some of the same adsorptive filtration media materials can be useful according to the present description, to function as adsorptive filtering media particles of novel and inventive filters described herein, for removing contamination such as any of various types of AMCs from a fluid flow. Some examples of types of these granular filtration media include: cation exchange resins, anion exchange resins, zeolites, metal oxides, salts, activated carbon (natural and synthetic), chemically-coated carbons, and chemically-coated polymers, any of which may be provided in a granular form that is capable of being fluidized when contained in a cell of a filter as described, with fluid flowing through a cell of a filter as described.

Any of these or other filter media can also include a chemical treatment, e.g., coating, that will improve the adsorptive properties of the filter media, for example, to improve adsorption of one or more general or specific types of airborne molecular contaminant. Useful chemical coatings for granular filter media can include: iodide solutions, hydroxide solutions, zinc chloride, carbonate and bicarbonate solutions, amines, citric acid, phosphoric acid, oxalic acid, sulfuric acid, and others that may be presently known or developed at a future time.

The type of AMC that a filter as described may effectively remove from a flow of gaseous fluid can be any general or specific type, including types of molecular contamination that are known and commonly present in an air atmosphere or an inert gas atmosphere found in an environment of semiconductor wafer or microelectronics processing and fabrication. Examples of general types of these airborne molecular contaminants can include: volatile acidic gases and aerosols, volatile bases, all classes of volatile and condensable organic compounds ranging from C2 to C30 compounds (this includes refractory and silicon containing compounds), and particulates (secondary).

Certain more specific example compounds include: acids such as NOx, SOx, HCl, HF, $H_2SO_4$, $HNO_3$, phosphoric acid, and hydrobromic acid, among others; bases such as amines, ammonia, ammonium hydroxide, tetraethylammonium hydroxide, methylamine, dimethylamine, trimethylamine, ethanolamine, morpholine, hexamethyldisilazane, cyclohexylamine, diethylaminoethanol, and n-methyl pyrrolidone (NMP), among others; condensables such as 2-propanol, silicones, xylene, heptane, benzene, siloxanes, butylated hydroxytoluene (BHT), among others; dopants such as B (e.g., BH), toluol, $AsH_3$, $B_2H_6$, $BF_3$, organophosphates, triethyl phosphate (TEP), TCPP, arsenic (e.g., arsenates), and O=P, among others; as well as other compounds that include oxidizing agents such as $H_2O_2$ and $O_3$, organic solvents such as acetone and isopropyl alcohol (IPA), and $H_2S$.

Filters of the present description can be useful in fluid handling systems that include adaptations for filtering, i.e., removing contamination from, a flow of fluid of any environment, by being included in a filtration component of any fluid handling system, e.g., any air-handling, or heating-ventilation-air-conditioning (HVAC) system. The filter can be inserted into an airflow passing, for example, into a duct, in a position and orientation to cause the airflow to pass also through an inventive filter of the present description. Air flows into the inlet side of the filter assembly, through cells of the filter assembly in an upward direction, and the exits the filter assembly at the outlet side. When passing through the cells, the fluid flow causes granular filter media particles contained in the cells to become fluidized and to allow AMCs carried in the fluid to efficiently be removed from the airflow by being adsorbed onto surfaces of the fluidized particles.

According to preferred filter embodiments, a filter assembly as described herein, which includes an array of cells and an optional frame, can be sized and shaped to fit within a designated duct or panel of a fluid handling system. Specifically, the fluid handling system can include a space that is adapted to contain the filter assembly so that when the filter assembly is located in the space, fluid (e.g., air) passes into an inlet side of the filter, through the filter and its cells, and exits the outlet side of the filter with a reduced concentration of AMC. Preferred filter assemblies for use in this type of fluid handling system may be of replaceable style, such as a frame-type or panel-type of filter that has dimensions that match the space of the fluid handling system. The size and shape of the filter assembly may be comparable to replaceable filters of pleated designs previously used in fluid handling systems, e.g., HVAC systems and clean room air processing systems, as opposed to more un-wieldy system configurations that operate with a fluidized bed and that involve a larger vessel commonly present in systems that process fluids by flow through a fluidized bed.

Advantageously, a frame-style or panel-style filter assembly as described herein can be easily placed into a flow of fluid by sliding the filter assembly into a designated space in a duct of a fluid handling system. The airflow may be horizontal, vertical upward, or vertical downward, and the filter assembly may be inserted into the flow of fluid to place the area of the filter transverse to the flow. As inserted within the fluid flow, an inlet side of the filter will face toward the incoming fluid flow (i.e., in an "upstream" direction), an outlet side of the filter will face in a direction of the exiting fluid flow (i.e., in a "downstream" direction), and the individual cells of the filter will be oriented in a vertical orientation, with a depth of the cells being in a vertical orientation. The filter assembly can be constructed to include cell intake channels that will direct or re-direct, if necessary, the flow of the fluid so that the fluid flows through the cells in a vertical (down-to-up) direction. The filter assembly will also include, if necessary, cell outlet channels that again re-direct the flow to back to the original direction of flow of the fluid. The filter assembly remains in place during a useful lifetime of the granular filter media contained in the cells. When the useful lifetime of the granular filter media has passed, the filter assembly can be removed from the duct, e.g., slid out of a space within the duct that is sized to fit the filter assembly, and a replacement filter assembly can be placed into the space within the duct for continued treatment of the fluid.

A particularly useful application of the described filter products and methods can be in clean rooms used in the semiconductor and microelectronics industries, such as clean rooms that process, test, or assemble bare semiconductor wafers or processed or in-process semiconductor products and microelectronics devices such as printed circuit boards, integrated circuits, solid-state memory devices, hard disk components and assemblies, flat panel displays, solar cells and panels, biochips, and similar products and devices. A cleanroom environment for these products includes equipment useful for processing a semiconductor wafer, microelectronic device, or component thereof, for example a semiconductor processing tool such as a scanner in lithography area coater developers, diffusion furnaces, minienvironments, tool interfaces (e.g., coating tools, cleaning tools, chemical-mechanical planarization tools, and the like), metal deposition equipment, doping apparatus, etc. Each of these different types of equipment will be associated with a processing fluid or material that may include liquid or gaseous chemical materials that can produce AMC, include fluids such as a liquid slurry, dopant, cleaning solution, organic solvents, acids and bases, oils, or any of other various examples. A filter as described may be placed in airflow that is part of an air handling unit or system that filters fresh air entering the cleanroom, or that filters recirculating air that exits and then re-enters the cleanroom after being filtered to remove contaminants.

In certain embodiments, the flow of the gaseous fluid (e.g., air, inert gas) through a cell of a filter as described is primarily in a direction that includes an upward component, meaning in a direction that opposes gravity, with a preferred direction being directly upward, i.e., vertical, opposite of the force of gravity. An upward flow of the fluid, at a proper flow rate, can be effective to produce an upward force on the granular filter particles, due to the upwardly-flowing fluid in contact against the filter media particles contained in a cell of a filter, with the force being sufficient to suspend the particles in a fluidized state within cells of the filter.

Flow parameters of a fluid flowing through a filter as described, such as linear velocity, pressure (i.e., pressure drop across the filter), and volumetric flow rate, can be as desired and as are useful for producing fluidization of filter media particles within cells of a filter. The combination of flow parameters (linear velocity, pressure, and volumetric flow rate) can be adjusted and selected to produce fluidization of the particles in the filter cells. Values of these parameters that will provide the desired fluidization of particles in a cell can depend on factors such as the type and properties of the particles (their size, shape, density, and surface features) and properties of the fluid, such as density.

Figure 4:
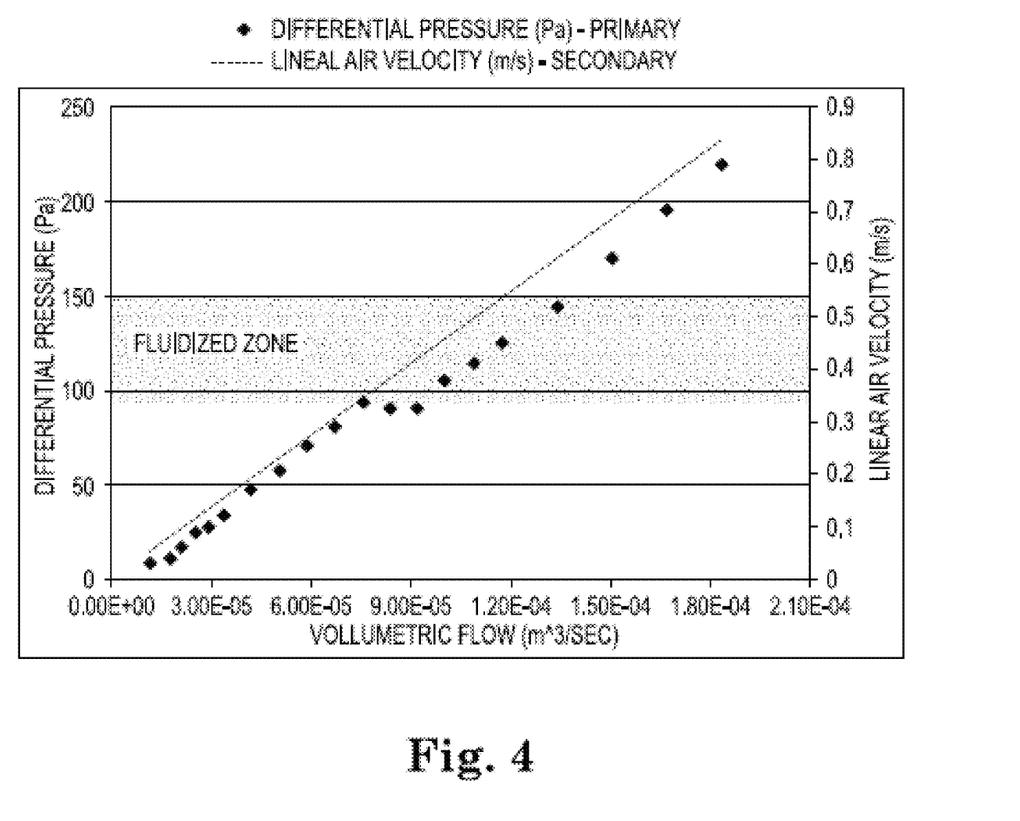
FIG. 4 is a graph comparing flow rate to other flow parameters, through a filter.

At FIG. 4 is a graph that shows linear velocity of a gaseous fluid (air) flowing, as well as differential pressure of the flow across a filter, versus a volumetric flow rate of the fluid. As shown, as flow increases from zero, the increase in differential pressure and linear air velocity increases linearly. The lower flow regime is associated with increasing pressure differential and increasing linear velocity, without effecting fluidization. At a location of a brief plateau, at which volumetric flow can increase slightly with no increase in differential pressure or linear air velocity, fluidization begins to occur. Above at flow rates greater than those at the plateau lies a fluidized zone, wherein filter media particles are free-flowing in a cell and fluidized, i.e., supported against gravity by the force of the fluid passing in an upward direction through cells of the filter. With too great of a volumetric flow rate, however, force against the particles will cause the particles to be held against cell outlets, eliminating the fluidized state of the particles.

The use of a filter as described, for removing AMCs from a gaseous fluid, can be effective to efficiently remove a major amount of such contaminants from a flow of fluid. The efficiency and total amount of removal of contaminants from a flow of fluid can be comparable, at least, and can preferably be improved, relative to prior art chemical filters used to remove similar contaminants from similar flows of gaseous fluid, e.g., airflows of a cleanroom environment. In example embodiments, air of a clean room that has passed through a filter as described can contain a reduced concentration of airborne molecular contamination, such as a level of airborne molecular contamination that is below about 1000 parts per trillion (ppt) total airborne molecular contaminants, e.g., below 500 ppt total airborne contaminants in a flow of gas exiting a filter of the present description. Stated in alternate terms, useful or preferred filters can exhibit a removal efficiency of at least 50 percent of an upstream concentration of a particular AMC, for example a removal efficiency in a range that is between 50 and 99 percent of an upstream concentration of a particular AMC (which may be any one of the specific chemical species listed herein as a molecular contaminant), such as an efficiency of at least 80, 90, 95, or 99 percent, depending on the particular species of airborne contaminant.

EXAMPLE

Figure 5:
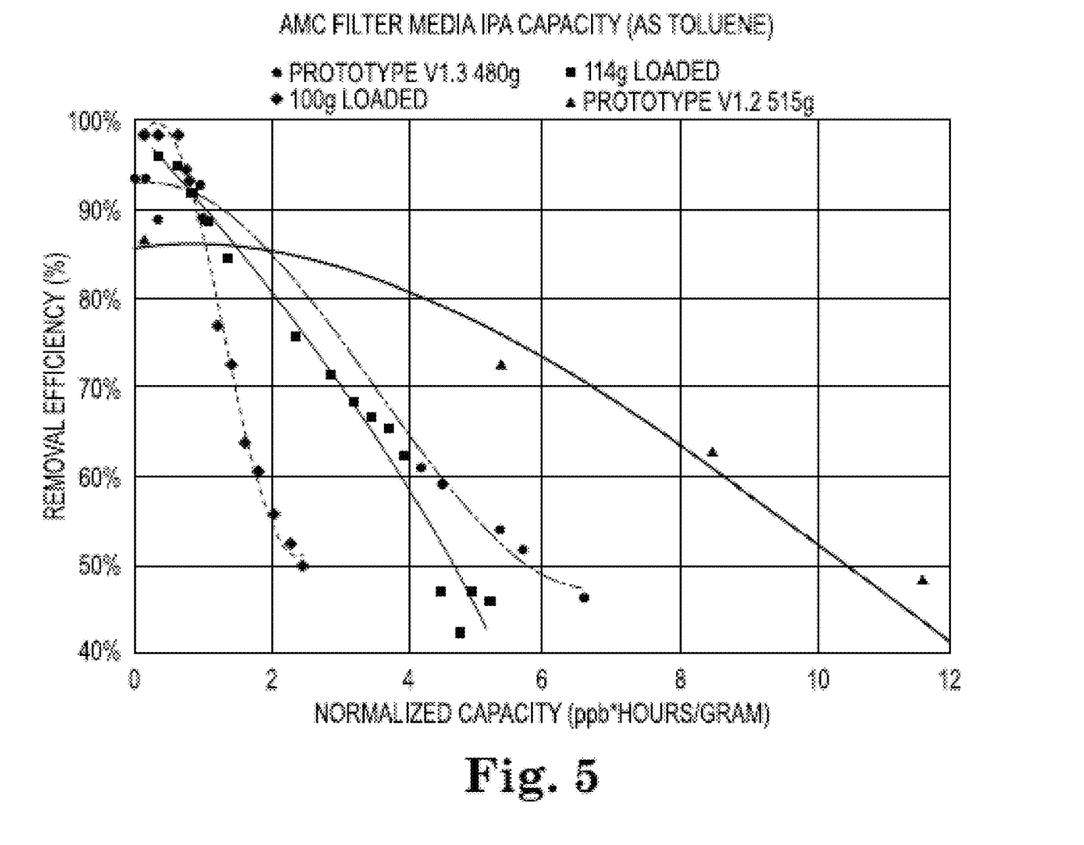
FIG. 5 shows information relating to the performance of inventive filter assemblies.

Two examples of inventive filter assemblies were prepared and tested, and compared based on performance to multi-layer pleated filter designs having comparable carbon adsorbent. See FIG. 5. The inventive filter assemblies are identified as Prototype V1.1 and Prototype V1.2. The comparison filters are identified as Pleated 100 g loaded (Carbon 1) and Pleated 114 g loaded (Carbon 2).

Prototype V1.1 included 480 grams per square foot of activated carbon (Carbon 1). Prototype V1.2 included 515 grams per square foot of a different activated carbon (Carbon 2). The two different types of activated carbon (Carbon 1 and Carbon 2) used in the Prototype and Pleated filters were purchased from Molecular Products Group Ltd., Harlow Essex UK.

The two different types of activated carbon were used in both inventive filters (V1.1 and V1.2) and also in the comparison Pleated filters; the Pleated comparison filters contained 100 g/ft2 (100 g loaded Carbon 1), or 114 g/ft2 (100 g loaded Carbon 2). The filters were tested in a 1'×1' filter size. There are 8.75 ft2 of pleated media per 1'×1' filter resulting in 875 g (Carbon 1) and 997.5 g (Carbon 2) per pleated filter. For each media type, the inventive fluidized prototype filter resulted in better performance with roughly 50% the total carbon loading.

The prototype V1.1 exhibited a normalized capacity of more than twice the capacity (50% RE) of the 100 g/ft2 loaded Carbon 1 comparison filter for IPA, at a linear air velocity of 0.5 meters per second and pressure drop of approximately 120 Pa.

Prototype V1.2 was similar to V1.1, but with an improved edge seal, and with 515 g/ft2 of Carbon 2. Prototype V1.2 exhibited a normalized capacity that was double (two times) the capacity of the 114 g/ft$^2$ Carbon 2 comparison filter.

The invention claimed is:

1. A filter adapted to remove contaminants from a flow of gaseous fluid, the filter comprising:
    two or more cells, each cell defined by a porous inlet cover, a porous outlet cover, and sidewalls extending between a cell inlet and a cell outlet, and each cell having a volume between the sidewalls, porous inlet cover, and porous outlet cover,
    an intake channel in fluid communication with the cell inlet of one of the two or more cells, the intake channel capable of receiving a flow of fluid moving in a first flow direction and changing the direction of the flow of the gaseous fluid to an upward flow passing through the one of the two or more cells, an output channel in fluid communication with the cell outlet of the one of the two or more cells, the output channel adapted to receive the gaseous fluid flowing from the one of the two or more cells and changing the direction of flow to a direction that is the same as the first flow direction, and granular filter media comprising individual granules contained within the volume of each of the two or more cells in a loose fashion that allows individual granules to move within the volume of each of the two or more cells in response to the upward flow of the gaseous fluid passing through each cell, wherein the granules are capable of becoming fluidized within an individual cell by the upward flow of the gaseous fluid passing through the cell.

2. The filter of claim 1 wherein each of the cells is characterized by a depth, which is a distance between the porous inlet cover and the porous outlet cover, the depth being at least 0.5 inches.

3. The filter of claim 1 comprising an array that contains the two or more cells, the array including a layer of cells having a repeating arrangement with cells aligned in parallel in the direction of the upward flow, and areas of the cell inlets aligned in a plane.

4. The filter of claim 3 comprising the array and a frame extending to define a perimeter, the array being supported by the frame within the perimeter, wherein the cells of the array are substantially uniform in volume and substantially uniform in depth.

5. The filter of claim 4 adapted to allow fluid to flow through the cells upwardly in a vertical direction, when the frame is oriented with a length and a width extending in a horizontal plane.

6. The filter of claim 4 adapted to allow the gaseous fluid to flow through the cells upwardly in a vertical direction, when the frame is oriented with a length and a width extending in a vertical plane.

7. The filter of claim 1, wherein the porous inlet cover is capable of allowing the gaseous fluid to pass into the cell and capable of containing granules within the cell at the cell inlet, and the porous outlet cover is capable of allowing the gaseous fluid to pass out of the cell, and capable of containing granules within the cell at the cell outlet.

8. The filter of claim 1 wherein the sidewalls are planar and are made of polymeric material.

9. The filter of claim 1 wherein the granules are selected from granules of: cation exchange resin, anion exchange resin, a zeolite, a metal oxide, a salt, natural activated carbon, synthetic activated carbon, and combinations thereof.

10. The filter of claim 1 wherein the granules are selected from chemically coated carbon and chemically coated polymer, the chemical coating comprising an iodide solution, a hydroxide solution, zinc chloride, carbonate solution, bicarbonate solution, amine, citric acid, phosphoric acid, oxalic acid, or sulfuric acid.

11. The filter of claim 1 wherein the granular filter media is capable of removing a contaminant from the flow of gaseous fluid passing through the filter, the contaminant selected from: a volatile acidic gas, a volatile basic gas, a volatile acidic aerosol, and a volatile organic compound.

12. A system for removing contaminants from a flow of gaseous fluid, the system comprising:
ducting to guide the flow of gaseous fluid, a space in fluid communication with the ducting to place a removable filter assembly in the flow of gaseous fluid to cause the flow of gaseous fluid to flow through the filter assembly, a removable filter assembly in the space, the removable filter assembly comprising:

two or more cells, each cell defined by a porous inlet cover, a porous outlet cover, and sidewalls extending between a cell inlet and a cell outlet, and each cell having a volume between the sidewalls, porous inlet cover, and porous outlet cover, an intake channel in fluid communication with the cell inlet of one of the two or more cells, the intake channel capable of receiving a flow of fluid moving in a first flow direction and changing the direction of the flow of the gaseous fluid to an upward flow passing through the one of the two or more cells, an output channel in fluid communication with the cell outlet of the one of the two or more cells, the output channel adapted to receive the gaseous fluid flowing from the one of the two or more cells and changing the direction of flow to a direction that is the same as the first flow direction, and granular filter media comprising granules contained within the volume of each of the two or more cells in a loose fashion that allows individual granules to move within the volume of each of the two or more cells in response to the upward flow of gaseous fluid passing through each cell, wherein the granules are capable of becoming fluidized within an individual cell by the upward flow of fluid passing through the cell.

13. The system of claim 12 adapted to remove airborne molecular contaminants from an environment of a clean room.

14. The system of claim 12 wherein the granules are selected from granules of:
cation exchange resin, anion exchange resin, a zeolite, a metal oxide, a salt, natural activated carbon, synthetic activated carbon, and combinations thereof.

15. A method of removing contaminants from a flow of gaseous fluid, the method comprising:
providing a filter comprising:

two or more cells, each cell defined by a porous inlet cover, a porous outlet cover, and sidewalls extending between a cell inlet and a cell outlet, and each cell having a volume between the sidewalls, porous inlet cover, and porous outlet cover, an intake channel in fluid communication with the cell inlet of one of the two or more cells, the intake channel capable of receiving a flow of fluid moving in a first flow direction and changing the direction of the flow of the gaseous fluid to an upward flow passing through the one of the two or more cells, an output channel in fluid communication with the cell outlet of the one of the two or more cells, the output channel adapted to receive the gaseous fluid flowing from the one of the two or more cells and changing the direction of flow to a direction that is the same as the first flow direction, and granular filter media comprising individual granules contained within the volume of each of the two or more cells in a loose fashion that allows individual granules to move within the volume of each of the two or more cells in response to the upward flow of gaseous fluid passing through each cell, wherein the granules are capable of becoming fluidized within an individual cell by the upward flow of fluid passing through the cell, and causing the gaseous fluid to flow through the two or more cells in a manner to cause the granules to become fluidized by the upward flow of the gaseous fluid.

16. The method of claim 15 wherein the gaseous fluid is air from an environment of a clean room.

17. The method of claim 16 wherein the gaseous fluid contains airborne molecular contaminants that become adsorbed on surfaces of the granular filter media during flow of the fluid through the two or more cells.

\* \* \* \* \*